US007753987B2

(12) United States Patent
Du et al.

(10) Patent No.: US 7,753,987 B2
(45) Date of Patent: Jul. 13, 2010

(54) HIGH VACUUM IN-SITU REFINING METHOD FOR HIGH-PURITY MATERIALS AND AN APPARATUS THEREOF

(75) Inventors: Xiaolong Du, Beijing (CN); Zhaoquan Zeng, Beijing (CN); Hongtao Yuan, Beijing (CN); Handong Li, Beijing (CN); Qikun Xue, Beijing (CN); Jinfeng Jia, Beijing (CN)

(73) Assignee: The Chinese Academy of Sciences Institute of Physics, Beijing (CN)

( * ) Notice: Subject to any disclaimer, the term of this patent is extended or adjusted under 35 U.S.C. 154(b) by 176 days.

(21) Appl. No.: 12/067,835

(22) PCT Filed: Apr. 11, 2006

(86) PCT No.: PCT/CN2006/000645

§ 371 (c)(1),
(2), (4) Date: Apr. 16, 2008

(87) PCT Pub. No.: WO2007/036094

PCT Pub. Date: Apr. 5, 2007

(65) Prior Publication Data

US 2008/0257109 A1    Oct. 23, 2008

(30) Foreign Application Priority Data

Sep. 28, 2005  (CN) .................. 2005 1 0105454
Sep. 30, 2005  (CN) .................. 2005 1 0105687

(51) Int. Cl.
C22B 9/04 (2006.01)
C22B 9/05 (2006.01)
C22B 26/00 (2006.01)
C22B 30/04 (2006.01)

(52) U.S. Cl. .................. 75/10.64; 75/680; 75/590; 75/595; 75/658; 75/669; 266/149; 266/208; 423/155; 423/195; 423/200

(58) Field of Classification Search ................. 266/149, 266/208; 75/10.64, 380, 590, 595, 658, 610, 75/669; 423/195, 155, 200
See application file for complete search history.

(56) References Cited

U.S. PATENT DOCUMENTS 2,960,331 A * 11/1960 Hanks .................. 373/10
4,403,769 A *  9/1983 Ishizuka .................. 266/149
2003/0145683 A1  8/2003 Tayama et al.

FOREIGN PATENT DOCUMENTS

| CN | 1184857 A      | 6/1998 |
| JP | 04036427 A  *  | 2/1992 |
| JP | 2002-212647 A  | 7/2002 |
| JP | 2003-213344 A  | 7/2003 |

\* cited by examiner

Primary Examiner—George Wyszomierski
Assistant Examiner—Tima M McGuthry-Banks
(74) Attorney, Agent, or Firm—AKC Patents LLC; Aliki K. Collins (57) ABSTRACT

The present invention concerns a high vacuum in-situ refining method for high-purity and superhigh-purity materials and the apparatus thereof, characterized in heating the upper part and lower part of crucible separately using double-heating-wires diffusion furnace under vacuum, thereby forming the temperature profile which is high at upper part and low at lower part of crucible, or in reverse during different stages; then heating the crucible in two steps to remove impurities with high saturation vapor pressure and low saturation vapor pressure respectively in efficiency; and obtaining high-purity materials eventually. The whole procedure is isolated from atmosphere, reducing contamination upon stuff remarkably. The present invention could provide products with high-quality and high production capacity, which are stable in performance, therefore is reliable and free from contamination. The present invention is appropriate for manufacture of high-purity and superhigh-purity materials, particularly for manufacture of high-activity high-purity materials.

9 Claims, 8 Drawing Sheets

HIGH VACUUM IN-SITU REFINING METHOD FOR HIGH-PURITY MATERIALS AND AN APPARATUS THEREOF

TECHNICAL FIELD

The present invention relates to a high vacuum in-situ refining method for high-purity and superhigh-purity materials and the apparatus thereof, more particularly to the method for removing the impurities with high saturation vapour pressure and low saturation vapour pressure by two steps by controlling temperature profile of the crucible, and to the apparatus thereof. The present invention belongs to melting field for high-purity and superhigh-purity materials in metallurgical and chemical industry.

BACKGROUND TECHNOLOGY

High-purity materials, such as high-purity metals, high-purity nonmetals and high-purity inorganic compounds and the like can be widely used for the manufacture of compound semiconductor materials and devices and also used in aviation industries. For example, purity of metal and nonmetal materials, such as zinc, magnesium, calcium, aluminum, arsenic and phosphorus and the like used in II-VI and III-V group elements compound semiconductors is required to be higher than 99.999%(5N), or otherwise, excess impurities would seriously affect crystallinity and photoelectric characteristics, resulting in sharp drop of device performance. Currently, vacuum distillation method or zone melting method or other refining methods mentioned in Chinese patents 98113973.6, 200320115091.0, 200320115092.5 and foreign patents KR2004022842-A, RU2236476-C1 and JP10121163-A are typically used for producing high-purity metals. When metals are in a high temperature state, the vacuum degree thereof is typically within the range of 10~0.01 Pa, and there is a lot of gas remaining in the vacuum chamber, which is rather bad for refining the active metals. In addition, separation and removal of different impurities differ a lot in removal efficiency during the process of refining the high-purity metals, and also there is no method for synchronously removing impurities with high saturation vapour pressure and low saturation vapour pressure in high efficiency. Therefore, overall purification effect is influenced. Also, the reaction method usually adopted for some inorganic compound materials lacks highly effective purification process.

SUMMARY OF THE INVENTION

The present invention is to provide a new high vacuum in-situ refining method for high-purity materials and the apparatus overcoming the drawbacks of the prior art. The method is excellent in purification effect and friendly to the environment, and the quality of the resulting product is stable and reliable. Furthermore, the refining technique has important industrial application value.

The high vacuum in-situ refining method for high-purity materials according to the present invention comprises the following steps:

1) Selecting the protective gas suitable for material purification using a high vacuum in-situ refining apparatus;

2) Heating the upper part of a crucible by the upper heating wire of the diffusion furnace and heating the lower part of the crucible by the lower heating wire of the diffusion furnace, and feeding suitable amount of rough-purity materials into the crucible to fill its lower part exactly, wherein the crucible in the high vacuum in-situ refining apparatus is separated into two parts, the said upper part and the said lower part, which correspond to the upper heating wire and the lower heating wire respectively;

3) Introducing the crucible filled with materials to be purified into the diffusion furnace, sealing the refining chamber of the furnace and then pumping high vacuum to make air pressure inside the refining chamber lower than $1.0 \times 10^{-4}$ Pa;

4) Heating the upper and lower parts of the crucible by individually controlling the double heating wires in the diffusion furnace, and making the temperature of the upper part higher than that of the lower part; heating the crucible stage by stage to the highest point of the temperature selected and remaining for a certain time at the temperature, the temperature of the upper part of the crucible should be always higher than that of the lower part during the process; keeping higher temperature of the upper part is intended to exhaust impurities evaporated from the raw materials with high saturation vapour pressure to outside through the small holes on the crucible cover;

5) Lowering the temperature of the upper part of the crucible, while increasing the temperature of the lower part of the crucible to the highest point of the temperature selected and remaining for a certain time at the temperature; the purified materials evaporate from the lower part and then condense on the relatively cool upper part of the crucible during this step, forming high-purity granules, while impurities with low saturation vapour pressure remain at the lower part of the crucible, implementing the in-situ separation of the purified materials and the impurities; the purpose of keeping lower temperature of the upper part is to make the vapour of the raw materials quickly condense around the mouth of the crucible, consequently blocking the small holes on the crucible cover;

6) Stopping heating the diffusion furnace, cooling down the crucible to room temperature, and removing the crucible from the refining chamber to a transparent sealing box filled with a protective gas; opening the crucible cover and collecting the high-purity granules on the upper part of the crucible;

7) Collecting the impurities at the bottom of the crucible, then cleaning the crucible in chemical way to fully remove the impurities for spare use;

8) Sampling and checking the high-purity granules, and packing the qualified products while refining the unqualified products according to the above steps 1)~7) again.

Furthermore, high-purity materials mentioned above include metals, nonmetals and compounds with boiling point below 2100° C., such as Lithium, Sodium, Potassium, Magnesium, Calcium, Strontium, Barium, Zinc, Cadmium, Europium, Ytterbium, Thallium, Arsenic, Selenium, Lithium Bromide, Lithium Iodide, Lithium hydroxide, Sodium Bromide, Sodium hydroxide, Magnesium Nitride, Magnesium Chloride and the like.

According to the present invention, there is provided a high vacuum in-situ refining apparatus for high-purity materials, comprising: a vacuum system, a refining chamber, a diffusion furnace, a crucible, a feeding and fetching system, a protective gas device and an industrial intelligent temperature controller (temperature controller, for short); wherein the feeding and fetching system is connected to the refining chamber, and the diffusion furnace is installed at the bottom of the refining chamber while the crucible is disposed inside the diffusion furnace, and the temperature controller is connected to the diffusion furnace through thermocouple compensating wires and conductive wires, the vacuum system is connected with the diffusion furnace and the protective gas device respectively; wherein the diffusion furnace has two independent heating wires inside, the upper heating wire and the lower heating wire, respectively used for heating the upper and lower parts of the crucible, thereby forming the temperature profile which is high at the upper part and low at the lower part of the crucible or in reverse; a cover is provided at the mouth of the said crucible with small holes uniformly scattered on the cover.

The vacuum system mentioned above further includes a backing pump, a molecular pump, an ion pump and a vacuum degree detector, wherein the molecular pump is connected to the backing pump which includes a vacuum pump such as mechanical vacuum pump or dry vacuum pump or the like. A resistance gauge and an ion gauge or composite gauge is installed between the backing pump and the molecular pump.

The refining chamber further has the upper and lower part connected to each other through a gate valve. The upper part of the refining chamber is connected to the molecular pump through another gate valve, while the lower part of the refining chamber is connected to the ion pump. There is ion gauge or composite gauge installed at the upper part of refining chamber.

The said feeding and fetching system further comprises a fork, a magnetic hand, a quick feeding valve, a view window, a hook on chamber's interior wall and a transparent sealing box, wherein the transparent sealing box is connected to the upper part of the refining chamber.

The protective gas device further comprises a high-pressure gas cylinder, a pressure reducing valve, a gas path and a leak valve and it is connected to the air inlet of the said molecular pump and the air inlet of the transparent sealing box respectively.

A condensation baffle is further disposed at the upper part of the refining chamber to collect impurities with high saturation vapour pressure.

Further, a handle disposed at the upper part of the crucible can be used together with the fork to fetch out the crucible from the diffusion furnace, and to move it to the upper part of the refining chamber, then the crucible is taken out through the feeding valve.

The present invention utilizes the diffusion furnace with double-heating-wires to separately control temperatures of the upper and lower part of the crucible, thereby forming the temperature profile which is high at the upper part and low at the lower part of the crucible or in reverse during different stages. The impurities with high saturation vapour pressure and low saturation vapour pressure are respectively removed by refining materials under high vacuum conditions in two steps. In the first step, the impurities with high saturation vapour pressure can be removed by increasing the temperature of the crucible by steps according to the temperature profile, which is high at the upper part and low at the lower part; In the second step, the crucible is heated to form the temperature profile which is low at the upper part and high at the lower part, and the temperature of the lower part is increased to the highest temperature selected and remained for a certain time at this temperature, making raw materials at the lower part evaporate and then recrystallize around the mouth of the crucible where the temperature is lower; thereby obtaining high-purity materials. Therefore, the present invention is characterized by:

1. The high vacuum in-situ refining device according to the present invention uses the sealing box and the refining chamber, which are firmly connected to each other and totally isolated from atmosphere. The whole producing procedures are performed in a protective gas environment. Meanwhile, the protective gas can be advantageously selected according to the properties of materials, thus dramatically reducing contamination brought by various components in the air upon high-purity materials;
2. When refining the materials, the whole refining chamber should be kept in a high vacuum state with background vacuum below $1 \times 10^{-4}$ Pa, thereby effectively decreasing the reaction and the recombination between high-purity materials and the residual gas at high temperature during refining, and eventually decreasing the effect of gas on materials. The high vacuum state is especially suitable for purification of active materials;
3. The temperature profile which is high at the upper part and low at the lower part of the crucible or in reverse during different stages can be obtained by heating the upper and the lower part of the crucible separately using double heating wires. The impurities with high saturation vapour pressure and low saturation vapour pressure under vacuum can be removed effectively by two steps. Therefore, this method is highly effective for removing several impurities, especially suitable for obtaining high-purity and superhigh-purity materials;
4. During production, the operators can work under good labor conditions by fully isolated from materials to be purified. The poisonous vapour generated when refining can be condensed and then be collected. The whole process is safe and cannot cause pollution to the environment.
5. It is simple and convenient to implement the present invention, and the quality of the resulting products is stable.

DESCRIPTION OF THE DRAWINGS

FIG. 1 is a block diagram of the high vacuum in-situ refining apparatus for high-purity materials according to the present invention; in which:

1 refining chamber, 2 vacuum system, 3 diffusion furnace, 4 crucible, 5 feeding and reclaiming system, 6 protective gas device, 7 temperature controller.

FIG. 2 is a structural schematic graph of the main body of the high vacuum in-situ refining apparatus according to the present invention, in which:

8 upper part of the refining chamber, 9 lower part of the refining chamber, 10, 41 gate valve, 11 transparent sealing box, 3 diffusion furnace, 4 crucible, 7 temperature controller, 12 molecular pump, 13 backing pump, 14 ion pump, 15 ion gauge or composite gauge, 16 resistance gauge, 17 protective gas cylinder, 18 condensation baffle.

FIG. 3 is a structural schematic graph of the feeding and fetching system, in which:

11 transparent sealing box, 19 quick feeding valve, 20 fork, 21 magnetic hand, 22 view window, 23 hook on chamber's interior wall, 4 crucible, 24 glove mouth.

FIG. 4 is a structural schematic graph of the diffusion furnace for refining high-purity materials according to the present invention, in which:

25 shell of the furnace, 26 anti-radiation metal cylinder, 27 PBN insulating support, 28 upper heating wire, 29 lower heating wire, 30 upper thermocouple, 31 lower thermocouple, 32 multi-layer anti-radiation metal piece, 33 vacuum flange, 34 thermocouple joint, 35 power supply plug.

38 upper part of the crucible, 39 lower part of the crucible, 36 side and front of the crucible cover, 37 hook of the crucible.

FIG. 7a and 7b are real object photos of example I before and after refining high-purity metal magnesium, respectively, in which:

40 magnesium granules with purity of 99.95% before refining, 41 recrystallized magnesium granules clusters with purity larger than 99.999% after refining;

FIG. 8a and 8b are real object photos of example II before and after refining high-purity metal calcium, respectively, in which:

42 calcium granules with purity of 99.5% before refining, 43 recrystallized calcium granules with purity larger than 99.999% after refining.

DETAILED DESCRIPTION OF THE INVENTION

The present invention would be explained in details with reference to the accompanying drawings. However, the explanation should not be regarded as limitation to the scope of the present invention.

Figure 1:
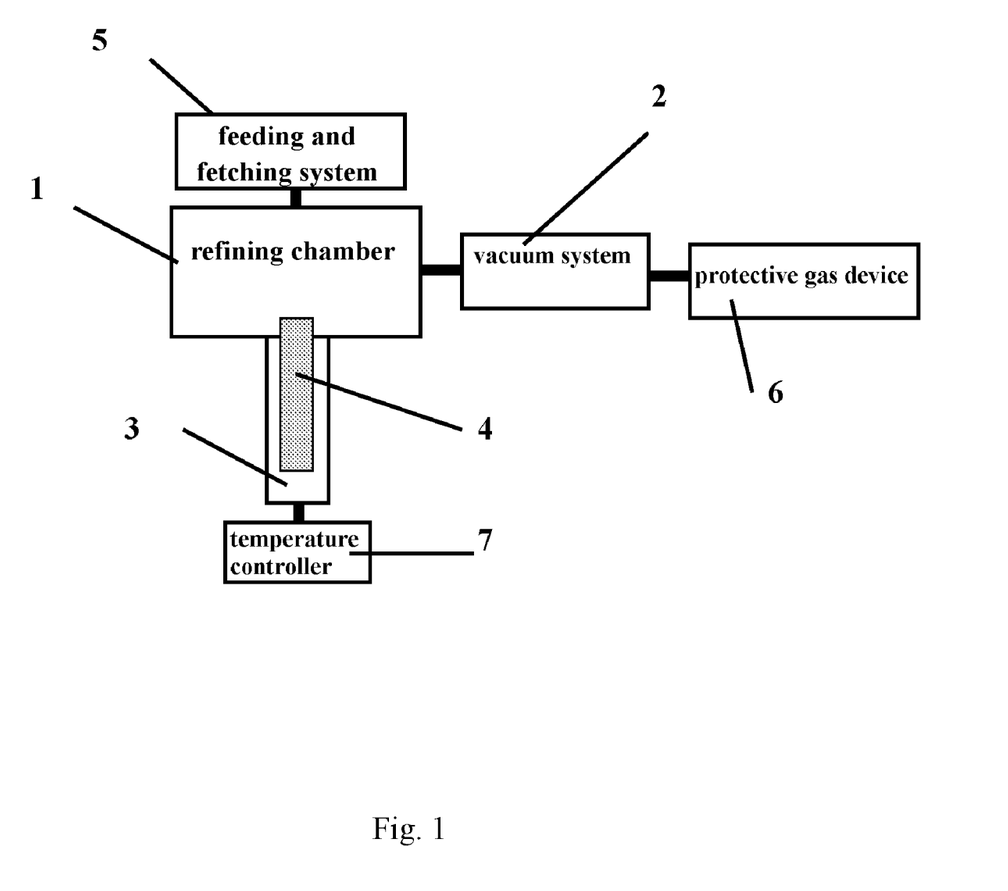

FIG. 1 is a block diagram of the high vacuum in-situ refining apparatus for high-purity materials according to the present invention. The apparatus comprises a refining chamber 1, a vacuum system 2, a diffusion furnace 3, a crucible 4, a feeding and fetching system 5, a protective gas device 6, and an industrial intelligent temperature controller (temperature controller, for short) 7. The vacuum system 2 is connected to the refining chamber 2 along its transverse direction. The protective gas device 6 is connected to the vacuum system 2 through a valve. The diffusion furnace 3 and the feeding and fetching system 5 are respectively connected to the lower and the upper part of the refining chamber 1 along their longitudinal direction, and the temperature controller 7 is connected to the diffusion furnace 3 through thermocouple compensating wires and power supply wires.

Figure 2:
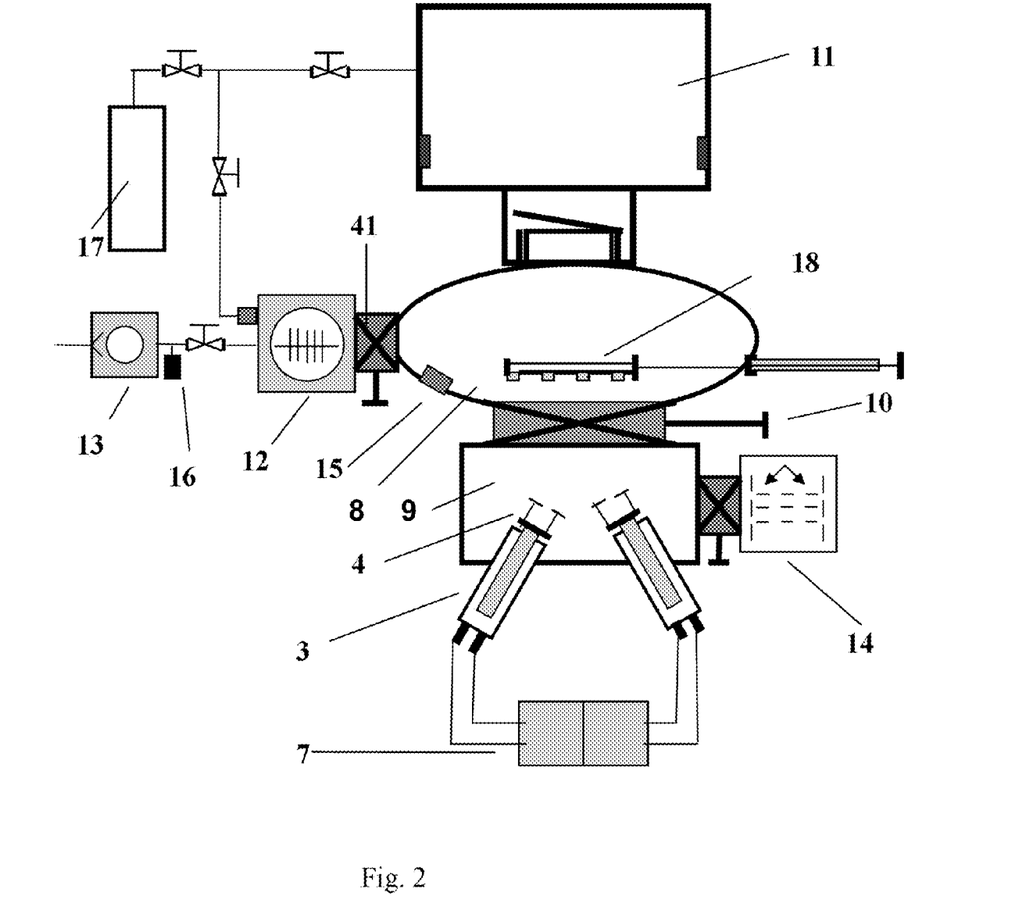

In the schematic graph of main body of the high vacuum in-situ refining apparatus as shown in FIG. 2, the refining chamber 1 is composed of the upper part 8 and the lower part 9, both of which are connected through the gate valve 10. The upper part 8 of the refining chamber is connected to the transparent sealing box 11 while the lower part 9 of the refining chamber is connected to the diffusion furnace 3. The diffusion furnace 3 is connected to the temperature controller 7 by means of thermocouple compensating wires and power supply wires. The vacuum system 2 is composed of a molecular pump 12, a backing pump 13, an ion pump 14, an ion gauge 15 and a resistance gauge 16. The molecular pump 12 is connected to the upper part 8 of the refining chamber through the gate valve 41 and also connected to the protective gas cylinder 17 through a leak valve and a pressure regulation valve. The ion pump 14 is connected to the lower part 9 of the refining chamber through the gate valve 10. A condensation baffle 18, installed at upper part of the gate valve 10, is used to condense for all the vapour diffused from the mouth of the crucible, and therefore it is easy to chang and can be used practically and conveniently.

Figure 3:
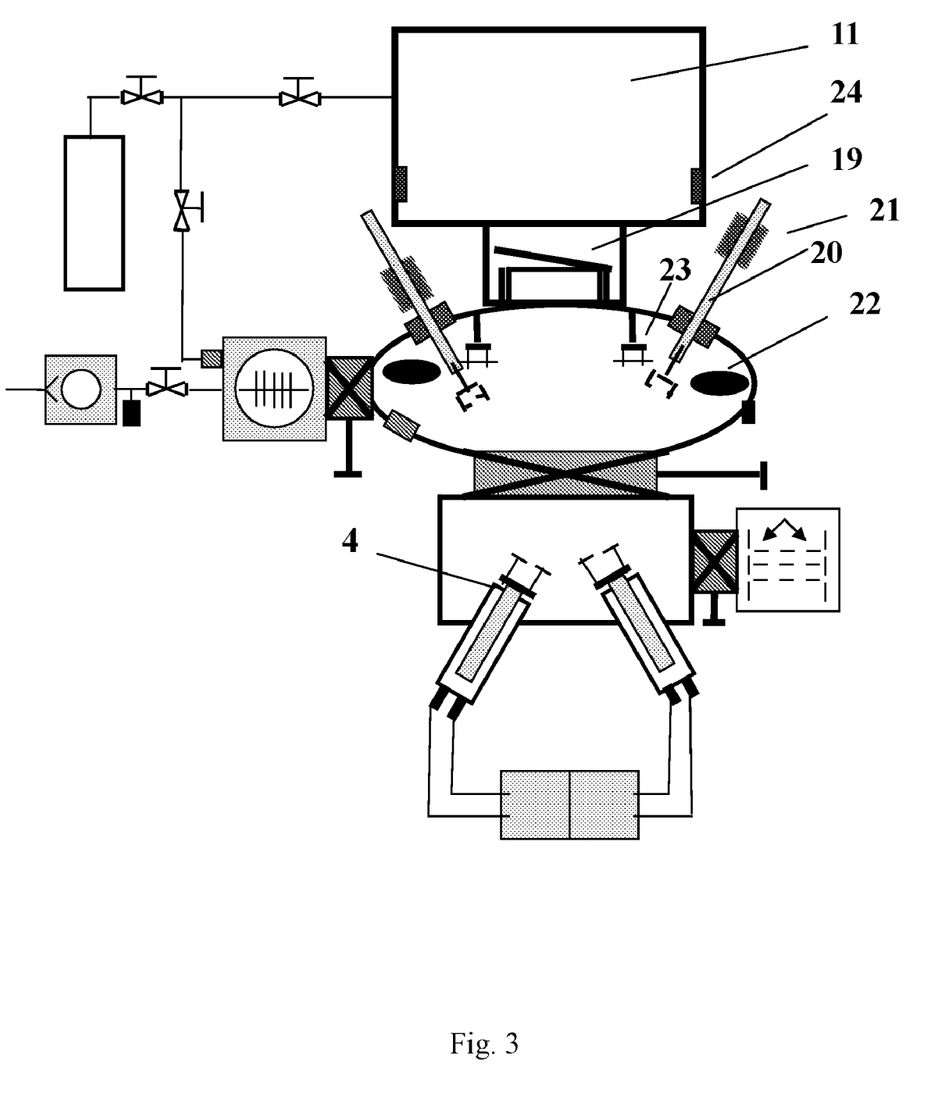

In the structural schematic graph of the feeding and reclaiming system as shown in FIG. 3, the system is composed of a transparent sealing box 11, a quick feeding valve 19, a fork 20, a magnetic hand 21, a view window 22, a hook on chamber's interior wall 23 and a crucible 4. When feeding, firstly put suitable amount of raw materials into the crucible in the transparent sealing box, then hang the crucible 4 at the hook on chamber's interior wall 23 and close the feeding valve 19. Pump high vacuum, then open the gate valve 10 of refining chamber 1 and put crucible 4 into the diffusion furnace 3 by using the fork 20. While fetching, fetch out the crucible 4 from the diffusion furnace 3 by using the fork 20 and hang the crucible on the hook 23; close gate valve 10, then stop molecular pump 12 and mechanical pump, fill in the protective gas, open the feeding valve 19, transfer the crucible 4 to the transparent sealing box 11; then fetch out the materials from the crucible 4, sample and check by selecting the recrystallization parts of the materials, and pack the qualified products. There are glove mouths 24 at both sides of the transparent sealing box 11, and related operations can be conducted by means of the glove mouths 24. During whole production, the high-purity materials are isolated from the atmosphere, thereby products with stable and reliable quality are guaranteed; at the same time, operators can be fully isolated from materials for purification with good production condition.

Figure 4:
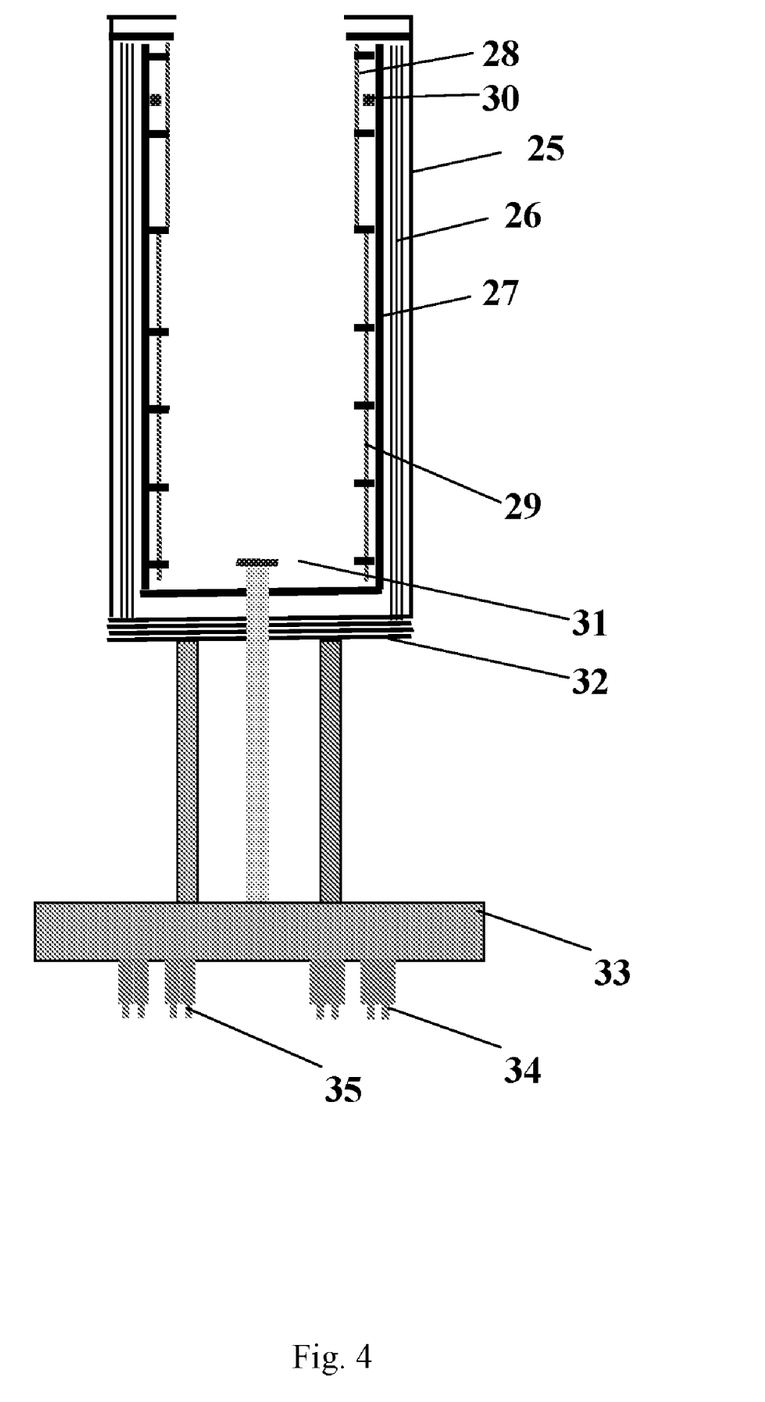

The structural schematic graph of the diffusion furnace for refining high-purity materials is shown in FIG. 4. There are two pieces of independent heating wires around the PBN insulating support 27, which are the upper heating wire 28 and the lower heating wire 29. Therefore, independent control on the upper and lower part of the crucible 4 can be implemented. The temperature profile which is high at the upper part and low at the lower part of the crucible or in reverse during different stages can be formed. The impurities with high saturation vapour pressure and low saturation vapour pressure are respectively removed by refining the materials under high vacuum conditions by two steps. In the first step, the impurities with high saturation vapour pressure can be removed by increasing the temperature of the crucible step by step according to the temperature profile which is high at the upper part and low at the lower part. The impurities with high saturation vapour pressure can evaporate from the raw materials and then can be discharged through the small holes on the cover, eventually condensed on the condensation baffle or pumped by the vacuum system. The purpose of keeping high temperature at the upper part of the crucible 4 is to prevent impurities vapour condense at the upper part; In the second step, the crucible is heated so as to form the temperature profile which is low at the upper part and high at the lower part. The temperature of the lower part is increased to the highest temperature selected and remained for a certain time at this temperature, making raw materials evaporate at the lower part and then recrystallize around the mouth of the crucible where the temperature is lower. In this way, the separate of the purified material and the impurities with low saturation vapour pressure is realized. And eventually the high-purity material is obtained. It is shown in FIG. 4 that other parts of the diffusion furnace include the shell 25, the multi-layer anti-radiation metal cylinder 26, the upper thermocouple 30 and the lower thermocouple 31, the multi-layer anti-radiation metal piece 32, the vacuum flange 33, the thermocouple joint 34 and the power supply plug 35; wherein the shell 25, the multi-layer anti-radiation metal cylinder 26 and the heating wires are all made of high-purity refractory materials, such as high-purity tantalum, niobium and molybdenum or the like with purity not lower than 99.99%, to ensure that the raw materials for refining cannot be polluted under high temperature.

Figure 5:
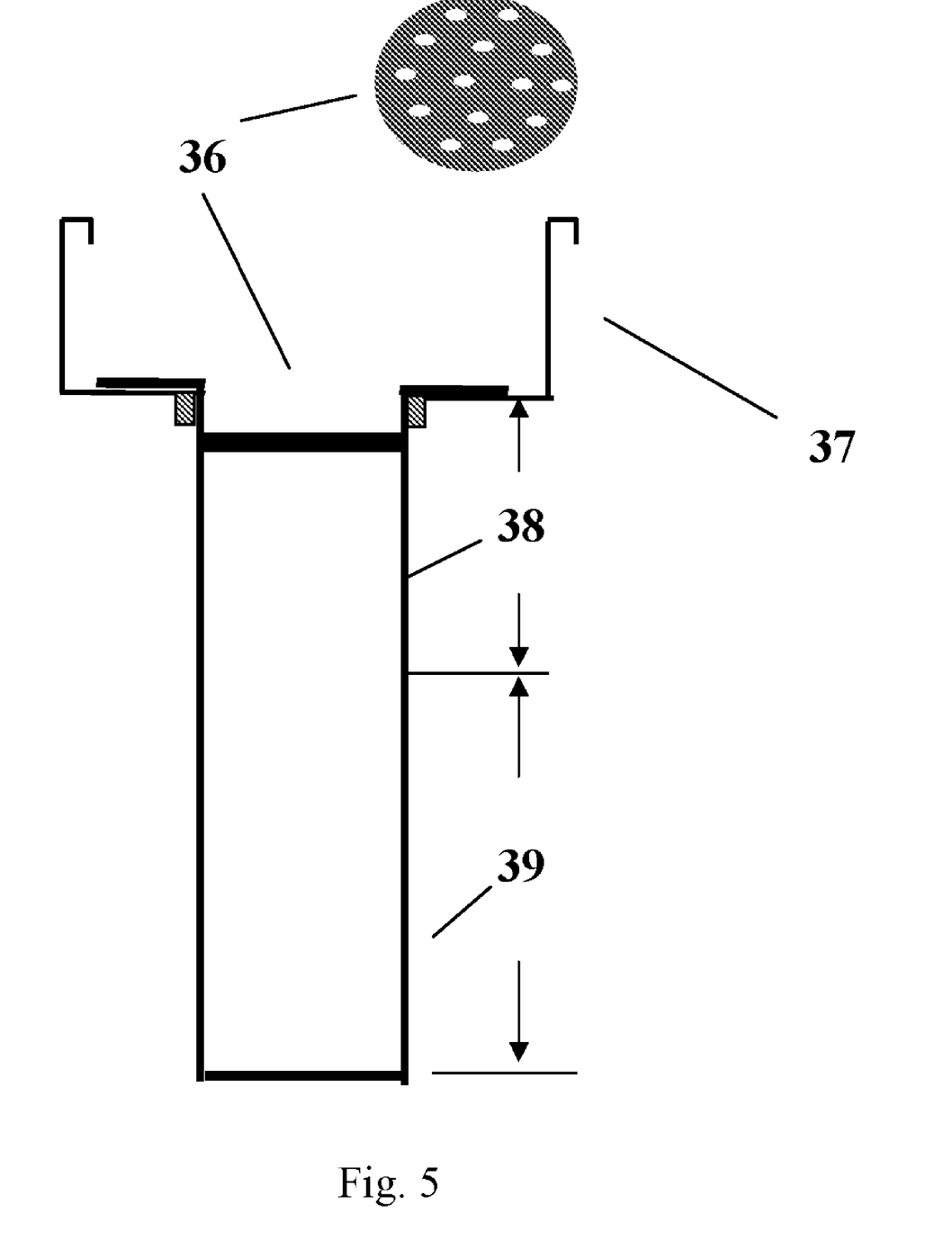
FIG. 5 is a structural schematic graph of the refining crucible for high-purity materials according to the present invention.
Figure 6:
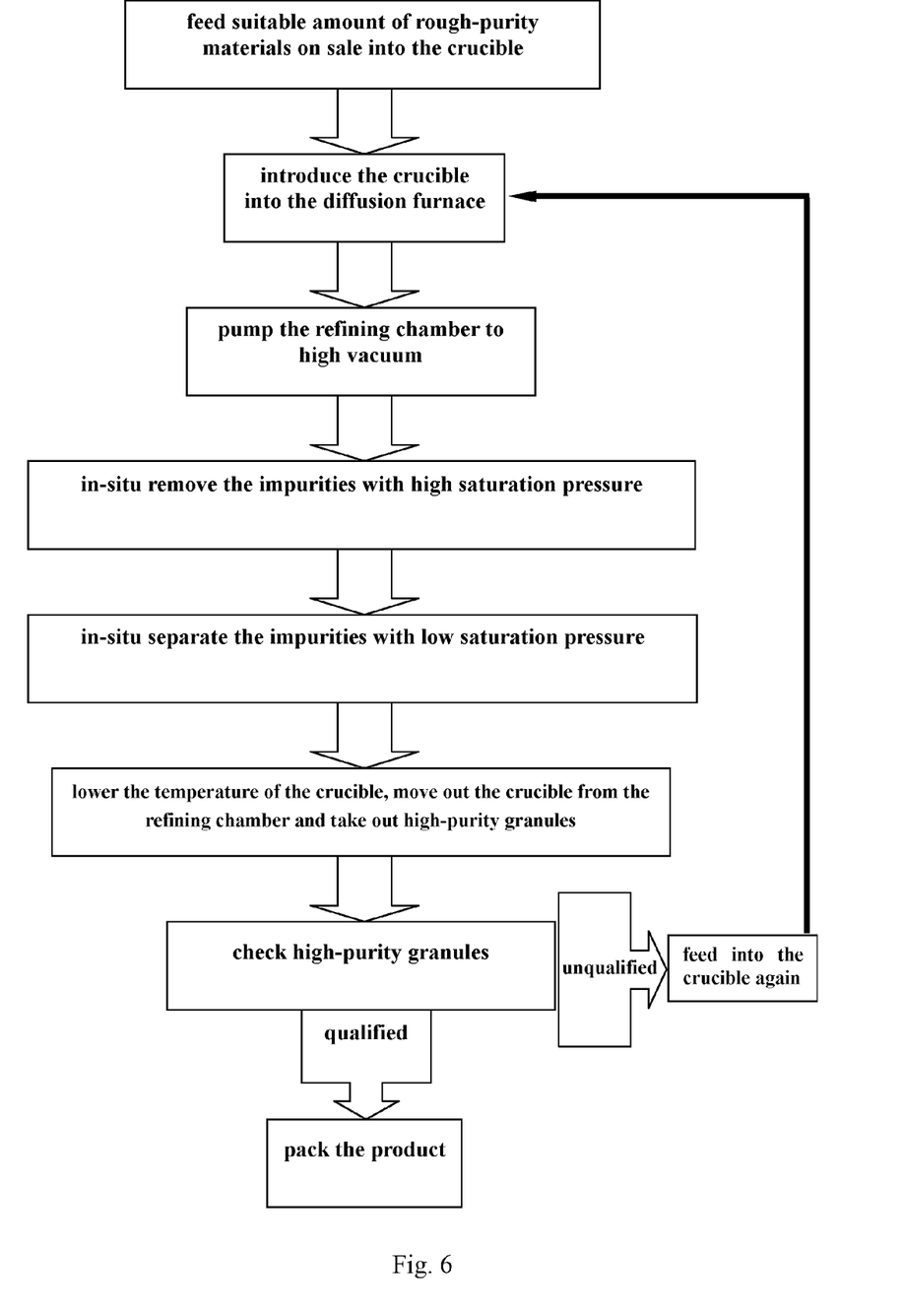
FIG. 6 is a process flow chart of high vacuum in-situ refining method by two steps for high-purity materials according to the present invention.

The structural schematic graph of the crucible is shown in FIG. 5. The crucible is separated into two parts, the upper part 38 and the lower part 39. On the crucible mouth, there is provided a cover 36 which can be firmly fitted with the crucible. Small holes with a diameter around 1 mm are uniformly distributed on the cover to exhaust impurities with high saturation vapour pressure. Suitable amount of raw materials is put in the crucible to fill the lower part 39 of the crucible. A hook 37 is provided on the upper part 38 of the crucible to transfer the crucible. The main body of the crucible is made of high-purity PBN, quartz, and high-purity ceramics and the like. The cover 36 and the hook 37 are made of high-purity refractory materials, such as high-purity tantalum, niobium, molybdenum, PBN, quartz, and high-purity corundum-ceramics and the like, ensuring that raw materials for refining cannot be polluted under high temperature.

EXAMPLE 1

A High Vacuum In-situ Refining Method for High-purity Metal Magnesium by Two Steps In the process flow diagram according to the present invention as shown in FIG. 1, the specific steps of refining high-purity metal magnesium by using the high vacuum in-situ refining method by two steps are as follows:

1) Fill high-purity argon gas in the high vacuum in-situ refining device as protective gas for purification of metal magnesium;
2) The crucible shown in FIG. 5 is composed of the upper and lower part 34, 35, which respectively correspond to the upper and the lower heating wire 28, 29 of the diffusion furnace shown in FIG. 4. That is, the upper part 38 of the crucible is heated by the upper heating wire 28 of diffusion furnace, while the lower part 39 of the crucible is heated by the lower heating wire 29 of the diffusion furnace 28. Suitable amount of rough-purity metal magnesium (99.95%) can be put in the crucible to fill the lower part 39 exactly;
3) Put the crucible filled with rough-purity metal magnesium into the diffusion furnace, seal the refining chamber, and pump high vacuum to make air pressure inside the refining chamber lower than $1.0 \times 10^{-4}$ Pa;
4) Independently heat the double heating wires 28, 29 of the diffusion furnace, and control the temperatures of the upper and the lower part 34, 35 of the crucible by thermocouple so as to form the temperature profile which is high at the upper part and low at the lower part; The temperature of the upper part 38 of the crucible is 50~100° C. higher than that of the lower part 39; Heat the crucible step by step to increase its temperature and remain at the highest temperature predetermined, and keep for a certain time. Specific steps to increase temperature are as follows: (1) the lower part of the crucible is kept at room temperature while the upper part of crucible is at 80° C., and keep for 5 minutes; (2) the lower part is kept at 200° C. while the upper part is at 280° C., keep for 10 minutes; (3) the lower part is kept at 400° C. while the upper part is at 480° C., keep for 10 minutes; (4) the lower part is kept at 500° C., and the upper part is at 580° C., keep for 10 minutes; (5) the lower part is kept at 600° C. while the upper part is at 680° C., keep for 10 minutes; (6) the lower part is kept at 660° C. while the upper part is at 710° C., keep for 20 minutes; during the temperature rising process above from step (1)~(5), the temperature rising rate is 5~20° C./minute, and the rate in the step (6) is 2~5°C./minute. During the whole temperature rising process at this stage, temperature of the upper part 38 is always higher than that of the lower part. The purpose of keeping high temperature of the upper part is to discharge the impurities with high saturation vapour pressure, which evaporate from the rough-purity metal magnesium, through small holes on the crucible cover. In order to fully evaporate and discharge the impurities with high saturation vapour pressure evaporating from rough-purity magnesium granules, the temperature of the lower part of the crucible in step (6) can be higher than 650° C., which is the melting point of magnesium. In this way, the magnesium granules can be melted, and the impurities contained in the magnesium granules can be quickly evaporated and exhausted from the small holes on the crucible cover 36, thereby improving the efficiency in removing impurities with high saturation vapour pressure.
5) Gradually decrease power of the upper heating wire 28 of the diffusion furnace to zero within 10 minutes, thereby decreasing the temperature of the upper part of the crucible. Meanwhile increase the temperature of the lower part 39 of the crucible to 680° C. and keep the temperature for 3 hours. During this stage, metal magnesium evaporates from the lower part and then condenses at the relatively cool upper part 38 of the crucible, forming the high-purity magnesium granules. However, the impurities with low saturation vapour pressure are left at bottom of the crucible, thereby the in-situ separation of metal magnesium and impurities can be realized. The purpose of keeping low temperature of the upper part of the crucible is to make metal magnesium vapour quickly condense around the mouth of the crucible and block the small holes on the crucible cover 36;
6) Gradually decrease power of the lower heating wire 29 of diffusion furnace to zero within 30 minutes, then cool the crucible to room temperature, fetch out the crucible from the refining chamber and put it into the transparent sealing box filled with high-purity argon gas; open the crucible cover 36 and take out high-purity magnesium crystallized at the upper part 38 of the crucible;
7) Collect impurities at the bottom of the crucible, then clean the crucible in chemical way to fully remove the impurities for spare use;
8) Sample and check the high-purity magnesium granules, then pack the qualified products while refine the unqualified products again according to the above steps 1)~7).

The advantage of the method of refining materials by two steps under high vacuum is that the impurities with high saturation vapour pressure and low saturation vapour pressure can be respectively removed. In the first step, the impurities with high saturation vapour pressure can be removed by increasing the temperature of the crucible step by step according to the temperature profile which is high at the upper part and low at the lower part; The impurities with high saturation vapour pressure can evaporate from the raw materials and can be discharged through the small holes on the cover. The purpose of keeping high temperature at the upper part of the crucible 4 is to prevent impurities vapour from condensing at the upper part; In the second step, the crucible is heated so as to form the temperature profile which is low at the upper part and high at the lower part. The temperature of the lower part is increased to the highest temperature and remained for a certain time at the temperature. In this way, the raw materials at the lower part evaporate and then recrystallize around the mouth of the crucible where the temperature is lower, thereby leading the separation of the puried materials and the impurities with low saturation vapour pressure, eventually obtaining high-purity materials.

Figure 7A:
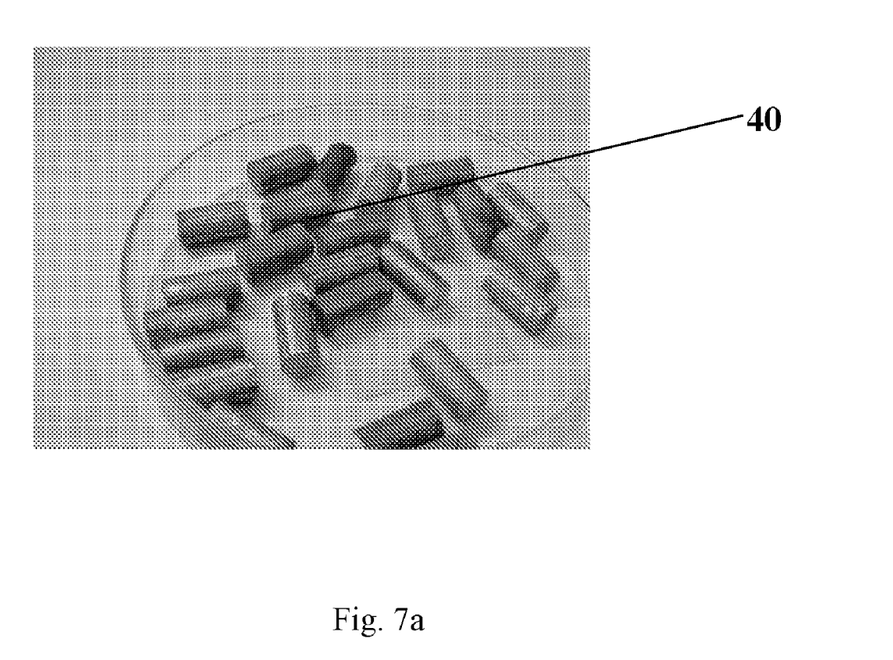
Figure 7B:
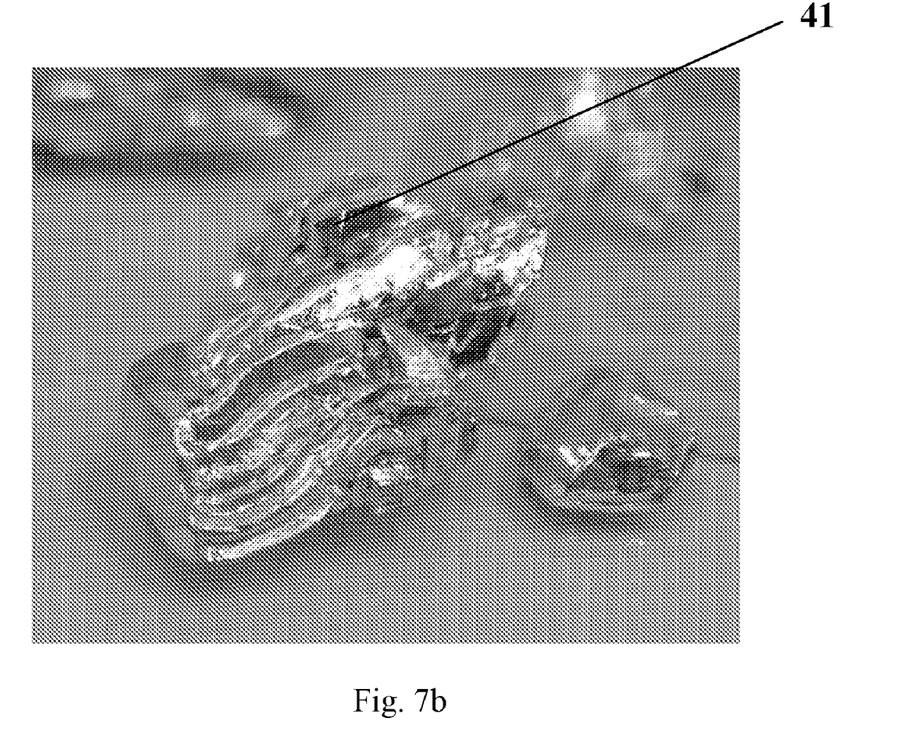

FIG. 7a and 7b have shown real object photos of example 1 before and after refining of the high-purity magnesium. Before refining, magnesium granules 40 are 99.95% metal magnesium on sale. After refining by use of the method according to the present invention, the recrystallized magnesium granule cluster 41 can be obtained around the mouth of the crucible. The magnesium granules that have been purified once can be refined twice, three times or several times to obtain superhigh-purity metal magnesium. We used inductively coupled plasma emission spectrometer to detect the impurities contained in the metal magnesium that has not been refined, the impurities in the metal magnesium that has been refined once and twice. The result is shown in Table 1. It is shown that the purity of metal magnesium refined once by using high vacuum in-situ two-step refining method according to the present invention is higher than 99.995%, while the purity of the metal magnesium refined once again is higher than 99.9992%. Metal magnesium with such purities totally satisfies harsh requirements of semiconductors, aviation industries, etc. and also has important economic and social benefits.

Table 1 provides data of purities of high-priority mangesium refined once and twice according to the present invention, and shows the comparison and analysis data of main impurities contained before and after refining.

TABLE 1

| Refining Times | Content of Main Impurities in Metal Magnesium (ppm) | | | Purity of Magnesium (%) |
| --- | --- | --- | --- | --- |
| | Zn | Si | Fe | Mg |
| Before refining | 53 | 47 | 35 | 99.95% |
| refined once | 0.9 | 8.2 | 1.4 | ≧99.995% |
| refined twice | 0.2 | 1.9 | 0.2 | ≧99.9992% |

EXAMPLE 2

High Vacuum In-situ Refining Method for High-purity Metal Calcium by Two Steps

In the process flow diagram according to the present invention as shown in FIG. 1, the specific steps of refining high-purity metal calcium by using the high vacuum in-situ refining method by two steps are as follows:

1) Fill high-purity argon gas in high vacuum in-situ refining device as protective gas for purification of metal calcium;

2) The crucible shown in FIG. 5 is composed of the upper and the lower parts 34, 35, which respectively correspond to the upper and the lower heating wire 28, 29 of the diffusion furnace shown in FIG. 4. That is, the upper part 38 of the crucible is heated by the upper heating wire 28 of the diffusion furnace, while the lower part 39 of the crucible is heated by the lower heating wire 28 of the diffusion furnace. Suitable amount of rough-purity metal Calcium (99.95%) can be put in the crucible to fill the lower part 39 exactly;

3) Put the crucible filled with rough-purity metal calcium into the diffusion furnace, seal the refining chamber, and pump high vacuum to make air pressure inside the refining chamber lower than $1.0 \times 10^{-4}$ Pa;

4) Independently heat the double heating wires 28, 29 of the diffusion furnace, and control the temperatures of the upper and lower parts 34, 35 of the crucible by thermocouple so as to form the temperature profile which is high at the upper part and low at the lower part. The temperature of the upper part 38 of the crucible is 20~100° C. higher than that of the lower part 39; Heat the crucible step by step to increase its temperature and reach to the highest temperature predetermined, and keep for a certain time; Specific steps to increase temperature are as follows: (1) the lower part of the crucible is kept at room temperature while the upper part of the crucible is at 80° C., and keep for 5 minutes; (2) the lower part is kept at 200° C. while the upper part is at 280° C., keep for 10 minutes; (3) the lower part is kept at 500° C. while the upper part is at 580° C., keep it for 10 minutes; (4) the lower part is kept at 650° C., and the upper part is at 720° C., keep for 10 minutes; (5) the lower part is kept at 800° C. while the upper part is at 850° C., keep for 10 minutes; (6) the lower part is kept at 850° C. while the upper part is at 880° C., keep for 10 minutes. During the temperature rising process above from step (1)~ step (5), the temperature rising rate is 5° C./minute, and the rate in the step (6) is 2° C./minute. During the whole temperature rising process at this stage, the temperature of the upper part 38 is always higher than the lower part. The purpose of keeping high temperature of the upper part is to discharge the impurities with high saturation vapour pressure evaporated from the rough-purity metal calcium through the small holes on the crucible cover. In order to fully evaporate and discharge the impurities with high saturation vapour pressure evaporated from the rough-purity calcium granules, the temperature of the lower part of the crucible in step (6) can be higher than 842° C., which is the melting point of calcium, so that the calcium granules can be melted and the impurities contained in the calcium granules can be quickly evaporated and be exhausted through the small holes on the crucible cover 36, thereby improving the efficiency in removing impurities with high saturation vapour pressure.

5) Gradually decrease power of the upper heating wire 28 of diffusion furnace to zero within 15 minutes, thereby decreasing the temperature of the upper part of the crucible. Meanwhile increase the temperature of the lower part 39 of the crucible to 860° C. and keep the temperature for 3 hours. During this stage, metal calcium evaporates from the lower part and then condenses at the relatively cool upper part 38 of the crucible, forming the high-purity calcium granules. However, the impurities with low saturation vapour pressure are left at the bottom of the crucible, thereby the in-situ separation of metal calcium and the impurities can be realized. The purpose of keeping low temperature of the upper part of the crucible is to make metal calcium vapour quickly condense around the mouth of the crucible and block the small holes on the crucible cover 36;

6) Gradually decrease power of the lower heating wire 29 of the diffusion furnace to zero within 30 minutes, then cool the crucible to room temperature, fetch out the crucible from the refining chamber and put it into the transparent sealing box filled with high-purity argon gas; open the crucible cover 36 and take out the high-purity calcium granules crystallized at the upper part 38 of the crucible;

7) Collect the impurities at the bottom of the crucible, then clean the crucible in chemical way to fully remove the impurities for spare use;

8) Sample and check the high-purity calcium granules, then pack the qualified products while refine the unqualified products again according to the above steps 1)~7).

Both calcium and magnesium in II Group elements are active metal with similar characteristics. Therefore, the refining processes according to the present invention for high-purity calcium and magnesium are similar, except the melting point of calcium is higher than that of magnesium, and the saturation vapour pressure of calcium is lower than that of magnesium at same temperature. Therefore, the temperatures for refining calcium in above step 4) and 5) are higher than those for refining magnesium, but the effect of purification is almost same. It is shown that the present invention is extremely suitable for purifying active metals.

Figure 8A:
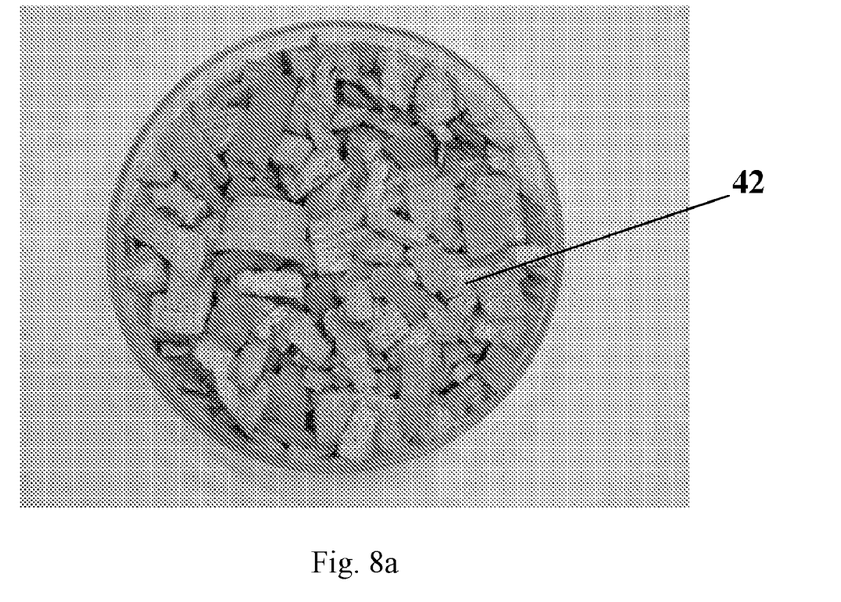
Figure 8B:
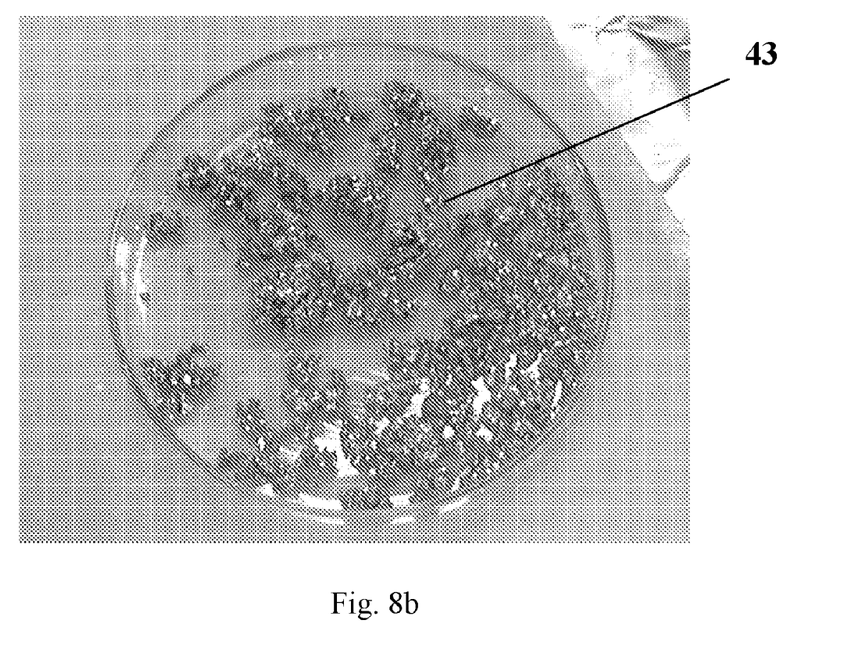

FIGS. 8*a* and 8*b* have shown real object photos of example 2 before and after refining high-purity calcium. Before refining, calcium scraps 42 are 99.5% metal calcium on sale. After refining by use of the method according to the present invention, recrystallized calcium granule cluster 43 can be obtained around the mouth of the crucible. We used inductively coupled plasma emission spectrometer to detect the impurities contained in metal calcium that has not been refined or has been once or twice refined. The result is shown in Table 2. It is shown that the purity of metal calcium refined once by means of the high vacuum in-situ two-step refining method is higher than 99.99%, while the purity of the metal calcium refined twice is higher than 99.999%. Metal calcium with such purities totally satisfies harsh requirements of semiconductors, aviation industries and the like and also has important economic and social benefits.

Table 2 provides data of purities of high-purity calcium that is once or twice refined and shows the comparison and analysis data of main impurities contained before and after refining.

TABLE 2

| Refining Times | Content of Main Impurities in Metal Calcium (ppm) | | | Purity of calcium (%) |
| --- | --- | --- | --- | --- |
| | Zn | Si | Cu | Ca |
| Before refining | 530 | 247 | 335 | 99.5% |
| refined once | 2.9 | 17 | 4.4 | ≧99.99% |
| refined twice | 0.6 | 2.7 | 0.2 | ≧99.999% |

EXAMPLE 3

High Vacuum in-situ Refining Method for High-purity Sodium Hydroxide by Two Steps In the process flow diagram according to the present invention as shown in FIG. 1, the specific steps of refining high-purity sodium hydroxide by the use of high vacuum in-situ refining method by two steps are as follows:

1) Fill high-purity argon gas in high vacuum in-situ refining device as protective gas for purification of sodium hydroxide;

2) The crucible shown in FIG. 4 is composed of the upper and lower parts 34, 35, which respectively correspond to the upper and lower heating wires 28, 29 of the diffusion furnace shown in FIG. 4. That is, the upper part 38 of the crucible is heated by the upper heating wire 28 of the diffusion furnace, while the lower part 39 of the crucible is heated by the lower heating wire 29 of the diffusion furnace. Suitable amount of rough-purity sodium hydroxide (99.7%) can be put in the crucible to fill the lower part 39 exactly;

3) Put the crucible with rough-purity sodium hydroxide inside into the diffusion furnace, seal the refining chamber, and pump high vacuum to make air pressure inside the refining chamber lower than $1.0 \times 10^{-4}$ Pa;

4) Independently heat the double heating wires 28, 29 of the diffusion furnace, and control the temperatures of the upper and lower parts 34, 35 of the crucible by thermocouple so as to form the temperature profile which is high at the upper part and low at the lower part. The temperature of upper part 38 of the crucible is 20~100° C. higher than that of lower part 39. Heat the crucible step by step to increase its temperature and remain at the highest temperature predetermined, and keep for a certain time; Specific steps to increase the temperature are as follows: (1) the lower part of the crucible is kept at room temperature while the upper part of crucible is at 80° C., and keep for 5 minutes; (2) the lower part is kept at 300° C. while the upper part is at 350° C., keep for 10 minutes; (3) the lower part is kept at 330° C. while the upper part is at 360° C., keep for 10 minutes; (4) the lower part is kept at 780° C., and the upper part is at 800° C., keep for 20 minutes. During the temperature rising processes from step (1)~(2), the temperature rising rate is 3° C./minute. In the step (3), the rate is 1° C./minute, and in the step (4), the rate is 3° C./minute. During the whole temperature rising process at this stage, the temperature of the upper part is always higher than that of the lower part. The purpose of keeping high temperature of the upper part is to discharge the impurities with high saturation vapour pressure evaporated from the rough-purity sodium hydroxide through the small holes on the crucible cover. Because the melting point of sodium hydroxide is 318° C., sodium hydroxide monohydrate generated by acting sodium hydroxide with residual water would be decomposed at the temperature and quickly evaporated. During this process the temperature should be increased slowly. Therefore, temperature rising rate in step (3) is 1° C./minute. After the rough-purity sodium hydroxide granules melt in step (3), water vapour and other impurities with high saturation vapour pressure inside would fully be evaporated and exhausted. The main impurities of sodium carbonate contained in the rough-purity sodium hydroxide begin to generate carbon dioxide when temperature reaches 400° C. Therefore, the reason why the temperature of the lower part of the crucible is higher than 400° C. in step (4) is to make sodium carbonate decompose into carbon dioxide and quickly evaporate.

5) Gradually decrease power of the upper heating wire 28 of the diffusion furnace to zero within 15 minutes, thereby decreasing the temperature of the upper part of the crucible. Meanwhile increase the temperature of the lower part 39 of the crucible to 790° C. and keep this temperature for 4 hours. During this stage, sodium hydroxide at lower part evaporates and then condenses at the upper part 38 of the relatively cool crucible so as to produce the high-purity sodium hydroxide granules. The impurities with low saturation vapour pressure are left at the bottom of the crucible. Therefore, the in-situ separation of sodium hydroxide and the impurities is realized. The purpose of keeping low temperature of the upper part of the crucible is to make sodium hydroxide evaporate quickly and condense around the mouth of the crucible and block the small holes on the crucible cover 36;

6) Gradually decrease power of the lower heating wire 29 of the diffusion furnace to zero within 30 minutes, then cool the crucible to room temperature, fetch out the crucible from the refining chamber and put it in the transparent sealing box filled with high-purity argon gas; open the crucible cover 36 and collect high-purity sodium hydroxide granules crystallized at the upper part 38 of the crucible;

7) Collect impurities at bottom of the crucible, then clean the crucible in chemical way to fully remove the impurities for spare use;

8) Sample and check the high-purity sodium hydroxide granules. Packing the qualified products while refine the unqualified products according to the above steps 1)~7) again.

We used inductively coupled plasma emission spectrometer to detect the impurities contained in sodium hydroxide that has not been refined or has been once or twice refined. The result is shown in Table 3. It is shown that the purity of sodium hydroxide that is refined once by use of the high vacuum in-situ two-step refining method is higher than 99.5%, while the purity of the sodium hydroxide that are refined twice is higher than 99.95%. Therefore, the present invention has good effect for purification of sodium hydroxide.

Table 3 provides data of purities of high-purity sodium hydroxide that is once or twice refined, and shows the comparison and analysis data of main impurities contained before and after refining.

TABLE 3

| Refining Times | Content of Main Impurities in Sodium Hydroxide | | | Purity of Sodium Hydroxide |
|---|---|---|---|---|
| | C | K | Ag | NaOH (%) |
| Before refining | 0.21% | 0.02% | 0.002% | 97% |
| Refined once | 0.02% | 0.003% | 0.0005% | ≧99.5% |
| Refined twice | 30 ppm | 4 ppm | 1 ppm | ≧99.95% |

In addition to magnesium, calcium and sodium hydroxide, the present invention is also suitable for other metals, non-metals and compounds with boiling point lower than 2100° C., such as lithium, sodium, potassium, strontium, barium, zinc, cadmium, europium, ytterbium, thallium, arsenic, selenium, lithium bromide, lithium iodide, lithium hydroxide, sodium bromide, magnesium nitride and magnesium chloride and the like.

The invention claimed is:

1. A high vacuum in-situ refining apparatus for high-purity materials, characterized in that it comprises: a vacuum system, a refining chamber, a diffusion furnace, a crucible, a feeding and fetching system, a protective gas device and an industrial intelligent temperature controller; wherein the feeding and fetching system is connected to the refining chamber with the diffusion furnace installed at its bottom; the crucible is disposed inside the diffusion furnace, and the temperature controller is connected to the diffusion furnace through thermocouple compensating wires and conductive wires; and the vacuum system is connected with the diffusion furnace and the protective gas device respectively, wherein the diffusion furnace has two independent heating wires, the upper heating wire and the lower heating wire, respectively used for heating the upper and the lower parts of the crucible, thereby forming the temperature profile which is high at the upper part and low at the lower part of the crucible or in reverse; a cover is provided at the mouth of the crucible with small holes uniformly distributed on the cover.

2. The high vacuum in-situ refining apparatus for high-purity materials according to claim 1, characterized in that the-vacuum system includes a backing pump, a molecular pump, an ion pump and a vacuum degree detector, wherein the molecular pump is connected to the backing pump, and the backing pump includes a vacuum pump such as mechanical vacuum pump or dry vacuum pump; there are resistance gauge and ion gauge or composite gauge installed between the backing pump and the molecular pump.

3. The high vacuum in-situ refining apparatus for high-purity materials according to claim 2, characterized in that the refining chamber has an upper and a lower part connected to each other through a gate valve, and the upper part of the refining chamber is connected to the molecular pump through another gate valve, while the lower part of the refining chamber is connected to the ion pump, and there is ion gauge or composite gauge installed at the upper part of refining chamber.

4. The high vacuum in-situ refining apparatus for high-purity materials according to claim 3, characterized in that the feeding and fetching system comprises a fork, a magnetic hand, a quick feeding valve, a view window, a hook on chamber's interior wall and a transparent sealing box disposed on the upper part of refining chamber, wherein the transparent sealing box is connected to the refining chamber.

5. The high vacuum in-situ refining apparatus for high-purity materials according to claim 4, characterized in that the-protective gas device comprises a high-pressure gas cylinder, a pressure reducing valve, a gas path and a leak valve, and it is connected to an air inlet of the molecular pump and the air inlet of the transparent sealing box respectively.

6. The high vacuum in-situ refining apparatus for high-purity materials according to claim 5, characterized in that a condensation baffle is further disposed at the upper part of the refining chamber to collect impurities with high saturation vapour pressure.

7. The high vacuum in-situ refining apparatus for high-purity materials according to claim 6, characterized in that a handle disposed at the upper part of the said crucible can be used together with the fork to fetch out the crucible from the diffusion furnace, and to move it to the upper part of the refining chamber, then the crucible is taken out through the feeding valve.

8. A high vacuum in-situ refining method for high-purity materials using the apparatus according to claim 1, characterized in that the method comprises the following steps:
  1) Selecting the protective gas suitable for material purification for the high vacuum in- situ refining apparatus;
  2) Heating the upper part of the crucible by the upper heating wire of the diffusion furnace and heating the lower part of the crucible by the lower heating wire of the diffusion furnace, and feeding suitable amount of rough-purity materials into the crucible to fill its lower part exactly; wherein the crucible in the high vacuum in-situ refining apparatus is separated into two parts, the upper part and the lower part, which correspond to the upper heating wire and the lower heating wire respectively;
  3) Introducing the crucible filled with materials to be purified into the diffusion furnace, sealing the refining chamber and then pumping high vacuum to make the air pressure inside the refining chamber lower than $1.0 \times 10^{-4}$ Pa;
  4) Heating the upper and the lower part of the crucible by individually controlling the two heating wires in the diffusion furnace and making the temperature of the upper part higher than the lower part; heating the crucible stage by stage to the highest temperature predetermined and remaining for a certain time at the temperature; the temperature of the upper part of the crucible should be always higher than lower part during the process; the purpose of keeping higher temperature of the upper part is intended to exhaust impurities with high saturation vapour pressure evaporated from raw materials through the small holes on the crucible cover;
  5) Lowering the temperature of the upper part of the crucible, while increasing the temperature of the lower part of the crucible to the highest temperature predetermined and remaining for a certain time at this temperature; the purified materials evaporate from the lower part and then condense on the relatively cool upper part of the crucible during this step, forming high-purity granules; while impurities with low saturation vapour pressure remain at the lower part of the crucible, realizing in-situ separation of the purified materials and impurities; Keeping lower temperature of the upper part is to make vapour of the raw materials quickly condense around the mouth of the crucible, consequently blocking small holes on the crucible cover;
  6) Stopping heating the diffusion furnace, cooling down the crucible to room temperature, and moving the crucible from the refining chamber to a transparent sealing box filled with a protective gas; opening the crucible cover and collecting the high-purity granules on the upper part of the crucible;

7) Collecting impurities at bottom of the crucible, then cleaning the crucible in chemical way to fully remove the impurities for spare use;

8) Sampling and checking the high-purity granules, and packing qualified products while refining-unqualified products according to the above steps 1)~7) again.

9. The high vacuum in-situ refining method for high-purity materials according to claim 8, characterized in that the high-purity materials include metals, nonmetals and compounds with boiling point below 2100, wherein said nonmetals and compounds with boiling point below 2100 comprise one of Lithium, Sodium, Potassium, Magnesium, Calcium, Strontium, Barium, Zinc, Cadmium, Europium, Ytterbium, Thallium, Arsenic, Selenium, Lithium Bromide, Lithium Iodide, Lithium hydroxide, Sodium Bromide, Sodium hydroxide, Magnesium Nitride, or Magnesium Chloride.

\* \* \* \* \*